Dec. 26, 1950 J. F. WIGGIN 2,535,711

FREQUENCY-COMPENSATED TELEVISION CAMERA CIRCUITS

Filed Dec. 8, 1948

Inventor:
Joseph F. Wiggin,
by Merton D. Moore
His Attorney.

Patented Dec. 26, 1950

2,535,711

UNITED STATES PATENT OFFICE 2,535,711

FREQUENCY-COMPENSATED TELEVISION CAMERA CIRCUITS

Joseph F. Wiggin, Syracuse, N. Y., assignor to General Electric Company, a corporation of New York Application December 8, 1948, Serial No. 64,183

4 Claims. (Cl. 179—171)

My invention relates to television camera circuits and, more particularly, to frequency compensation of the load circuits associated with a television camera tube.

In a television camera pickup system, it is usually necessary to use a relatively high resistive load across the camera tube in order that a good signal to noise ratio may be achieved. Conventional camera tubes, such as iconoscopes, deliver very small signal currents which make a high resistance load necessary in order to obtain fairly large signal voltages, especially in the low frequency region. However, such a resistive load is accompanied with inevitable distributed shunt capacity which causes the response at high frequencies to be greatly reduced. In order to obtain good picture quality without distortion, it is necessary that the frequency response be substantially linear over the band of operating frequencies corresponding to the picture signals. This band is, of course, approximately 5 megacycles wide in current television broadcasting practice. Without compensation, the effective load impedance $Z_0$ decreases with frequency, approaching a value inversely proportional to the frequency, as shown by:

$$Z_0=\frac{R_0}{1+j\omega R_0C_0} \qquad (1)$$

where $R_0$ is the load resistance and $C_0$ the inherent distributed shunt capacitance across $R_0$. Hence, it can be seen that some form of compensation is necessary in order that the overall response may have a constant value over the operating range of frequencies.

One of the means that has been used for compensation, and which is theoretically exact in its simplest form, comprises an impedance $Z_c$, having inductance and resistance in series, connected as the plate load in an amplifier coupled to the camera output, in which the impedance is:

$$Z_c=R_c\left(1+j\omega\frac{L_c}{R_c}\right) \qquad (2)$$

where $R_c$ is the resistance and $L_c$ the inductance of the impedance $Z_c$. The requirement for compensation is that:

$$R_0C_0=\frac{L_c}{R_c} \qquad (3)$$

Under this condition, the compensation would thus be exact if there were no shunt capacity. However, inherent shunt capacity is inevitable, and it resonates with $L_c$, thereby causing the response to rise above the desired curve. By making $L_c$ and $R_c$ small so that their resonant frequency will lie far above the desired band of frequencies, this rise in response at the high frequencies can be made as low as desired. It has the disadvantage, however, in that it results in reduced gain for the compensating stage. In fact at low frequencies the gain is often so low that a good signal-to-microphonic-noise ratio cannot be maintained without overloading the tube driving the compensating network.

It is an object of my invention to provide an improved camera tube amplifier overcoming the above difficulties.

A further object of my invention is to provide a television amplifier compensating circuit in which the frequency response is linear over a wide range of frequencies.

Another object of my invention, is to provide a camera tube amplifying system having a large gain and ideal frequency response over a large band of frequencies.

For additional objects and advantages, and for a better understanding of my invention, attention is now directed to the following description and accompanying drawings, and also to the appended claims in which the features of the invention believed to be novel are particularly pointed out.

In the drawings:

Fig. 1 diagrammatically shows a portion of a television camera circuit containing an embodiment of my invention;

Figure 1:
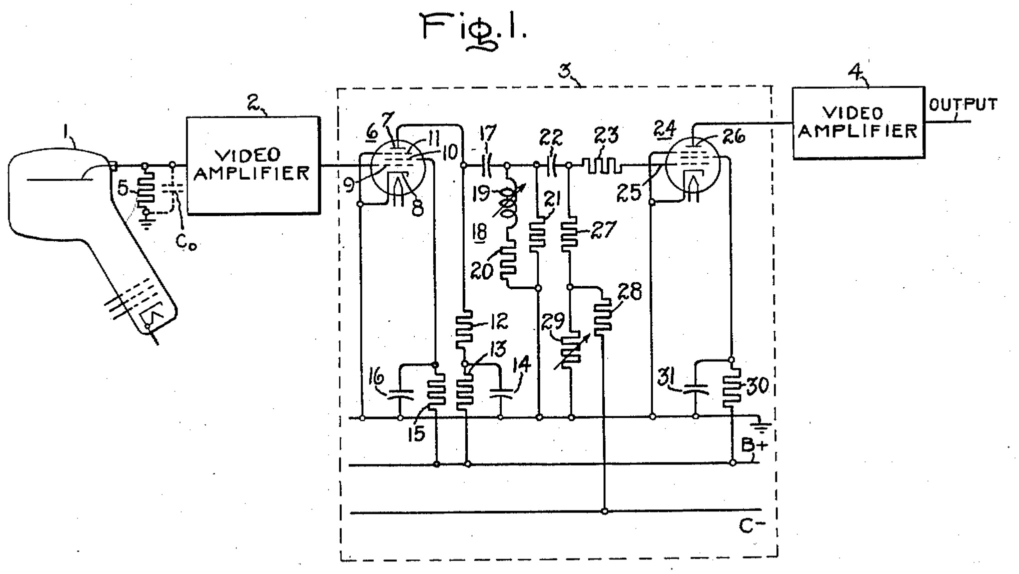

Referring now to Fig. 1, I have illustrated, in simplified form, a camera tube 1 having an output load resistor 5. The output developed across the load resistor 5 is supplied to amplifier stages 2, 3 and 4. It is understood, however, that there may be more or less stages of amplification. I have shown four stages for illustration only. Inasmuch as the tube 1 and amplifier stages 2 and 4 are conventional, a detailed explanation of these parts will be omitted for simplicity.

The stage 3 comprises a conventional pentode amplifier 6 having an anode 7, cathode 8, control grid 9, screen grid 10, and suppressor grid 11. The cathode 8 and suppressor grid 11 are connected directly to ground potential. The control grid 9 is connected to the video output of the preceding stage 2. Anode operating potential is supplied from suitable source of unidirectional voltage, designated by the conventional symbol B+, through resistors 12 and 13. A capacitor 14 connects the common terminal of resistors 12 and 13 to ground. The screen grid 10 obtains suitable bias from the B+ supply through a resistor 15 which is bypassed to ground by a capacitor 16. A coupling capacitor 17 connects the anode 7 to a compensating circuit 18 comprising inductance 19 and resistance 20 connected in series and shunted by resistance 21. The adjustment and function of this circuit will be discussed in greater detail below.

A capacitor 22 and resistor 23 couple the video output from the circuit 18 to the grid 25 of a second pentode amplifier 24. The anode 26 of the pentode 24 is connected to the input of the final video stage 4. Operating bias for the grid 25 is obtained through resistances 23 and 27 connected to the junction of resistances 28 and 29. Resistance 29 is connected to ground and resistance 28 is connected to a source of negative voltage, designated by the conventional symbol C−. Gain control can be obtained by varying the negative bias, such as by varying resistance 29.

While I have, for purposes of illustration, shown the compensating circuit in the stage 3, it may be in any of the other amplifier stages.

In the compensating circuit 18, as described above, the resistor 21 loads the series circuit 19, 20 so that its response actually drops below the ideal response at the higher frequencies but approximates the ideal linear curve over the entire band of picture signal frequencies. This will be better understood from Figs. 2, 3 and 4 and the following description.

Figure 2:
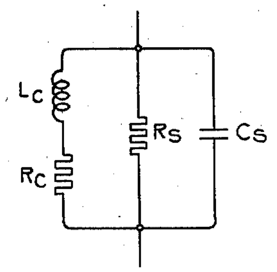
Fig. 2 is a schematic diagram of the compensating circuit of my invention.
Figure 3:
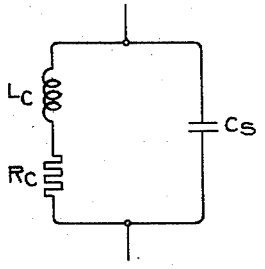
Fig. 3 is a diagram of a similar circuit but without compensation.

Let the load resistance across the camera tube be represented by $R_0$ and the inherent distributed shunt capacity to be compensated be represented by $C_0$. Fig. 2 represents the compensating network 18, of Fig. 1, in which $L_c$ is the series inductance of coil 19, $R_c$ is the series resistance of coil 19 and resistor 20, and $R_s$ the shunt resistance 21. The inherent distributed capacity across network 18 is also represented by $C_s$. Fig. 3 represents the compensating circuit of the prior art, which is the same except for the omission of resistance $R_s$.

The general equation for impedance $Z_c$ of a compensating circuit, as shown in Fig. 2, is as follows:

$$Z_c=\frac{R_c+j\omega L_c}{1+\frac{R_c}{R_s}-\omega^2 L_c C_s+j\left(\frac{\omega L_c}{R_s}+R_c\omega C_s\right)} \quad (4)$$

It can be seen that the expression in the numerator is the desired impedance for the compensation network. It is, therefore advantageous to make the expression in the denominator as nearly unity as possible. This may be done by selecting a value of $R_s$ such that $$R_s=\frac{L_c}{\sqrt{2L_cC_s-R_c^2C_s^2}} \quad (5)$$

Disregarding the second-order term which is very small in usual practice, this may be simplified for practical purposes to:

$$R_s=\sqrt{\frac{L_c}{2C_s}} \quad (6)$$

Assuming $\delta$ is the ratio of the impedance of the compensating circuit to the ideal impedance for an overall linear frequency response and $\theta$ is the phase angle of this ratio, then it can be shown that:

For the case without shunt $R_s$:

$$|\delta|\cong\frac{1}{1-\frac{\omega^2}{\omega_0^2}} \quad (7)$$

where $$\omega_0^2=\frac{1}{L_cC_s} \quad (8)$$

$$\theta=\tan^{-1}\frac{\omega R_cC_c}{1-\frac{\omega^2}{\omega_0^2}} \quad (9)$$

For the case with optimum shunt $R_s$:

$$|\delta|\cong\frac{1}{\sqrt{1+\frac{\omega^4}{\omega_0^4}}} \quad (10)$$

$$\theta\cong\tan^{-1}\frac{\omega\left(\frac{L_c}{R_c}+R_sC_s\right)}{1-\frac{\omega^2}{\omega_0^2}} \quad (11)$$

Consider a numerical example based on actual television camera practice. The impedance can be compared with and without the correcting resistor 21 as illustrated by the curves in Fig. 4. For example, an input circuit of 2 micromicroseconds time constant will be assumed, thus requiring a compensation circuit which also has a two micromicrosecond time constant. The maximum departure allowable from the ideal impedance at 5 megacycles is assumed to be 3%. A value of 30 micromicrofarads will be assumed for the value of $C_s$ which is typical for interstage coupling circuit capacity. By using these assumptions, proper circuit values can be calculated with and without the shunt resistance and the impedance functions can be produced showing the relative gains obtainable.

When $R_s$ is not used, it can be shown that for 3% departure from ideal, $\alpha=.165$ $$\alpha=\frac{\omega}{\omega_0}$$

$$\omega_0=\frac{2\pi\times5\times10^6}{.165}=191\times10^6$$

$$L_c=\frac{1}{\omega_0^2C_s}=.92\ \mu\text{hy.}$$

$$\frac{L_c}{R_c}=2\times10^{-6}$$

$$R_c=.46\text{ ohm}$$

Figure 4:
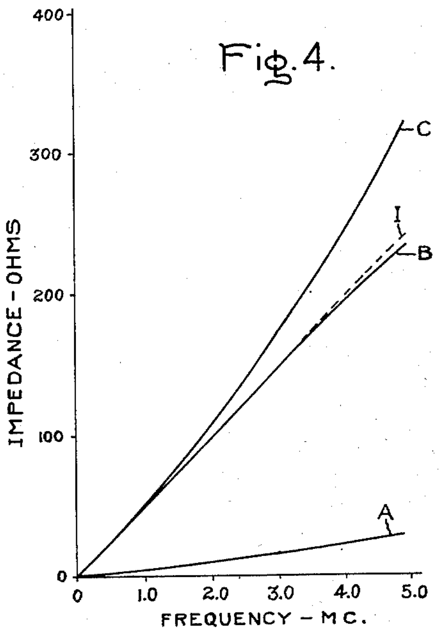
Fig. 4 is a graph illustrating certain frequency response characteristics of the system of my invention.

The circuit without $R_s$ is that shown in Fig. 3, and its impedance versus frequency characteristic is plotted as curve A in Fig. 4.

When $R_s$ is used, 3% departure from ideal occurs at $\alpha=.5$.

$$\omega_0=\frac{2\pi\times5\times10^6}{.5}=62.8\times10^6$$

$$L_c=\frac{1}{\omega_0^2C_s}=8.45\ \mu\text{hy.}$$

$$\frac{L_c}{R_c}=2\times10^{-6}$$

$$R_c=4.23\text{ ohms}$$

$$R_s=\frac{L_c}{\sqrt{2L_cC_s-R_c^2C_s^2}}=375\text{ ohms}$$

the error in neglecting $R_c^2C_s^2$ compared to $2L_cC_s$ is only one part in 20,000 for this example.

The impedance versus frequency characteristic is shown in Fig. 4 as the curve B. The desired or ideal response is shown by the curve I. Using the above values, the impedance versus frequency characteristic with $R_s$ omitted is shown in curve C.

These values produce a drop in the ratio of the impedances below unity which is approximately proportional to the fourth power of frequency and will be approximately 3% at the maximum frequency of the video band. The drop then continues so that at resonance of $L_c$, $C_s$ the ratio is about .7. A phase lag of 42° maximum is produced but this phase angle is very nearly proportional to the frequency and hence introduces a time delay which is approximately constant over the frequency range in a manner similar to a conventional compensated video amplifier stage.

By the use of the shunt resistor, it can be seen that an improvement in gain of about 8 times can be realized without sacrifice in the uniformity of response as is illustrated by the curves in Fig. 4.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In combination, a television camera tube, a load impedance network for said tube having inherent shunt capacity, an output network electrically coupled to said load network, and a compensating network connected across said load network, said compensating network having two parallel branches, one branch comprising inductance $L_c$ and resistance in series and the other branch comprising resistance R and shunt capacitance $C_s$, said load and compensating networks having substantially the same time constant and the shunt resistance R having a value substantially equal to $$\sqrt{\frac{L_c}{2C_s}}$$

whereby the frequency response is substantially linear over a range of video frequencies supplied to said output network.

2. In a television camera circuit, a source of video signals, a load circuit having resistance and shunt capacity connected across said source, and a compensating circuit connected across said load circuit, said compensating circuit having two parallel branches, one branch comprising an inductance $L_c$ and resistance in series and the other branch comprising shunt resistance R and shunt capacity $C_s$, said load circuit and said compensating circuit having substantially the same time constant and the value of said shunt resistance R being proportioned to have a value substantially equal to $$\sqrt{\frac{L_c}{2C_s}}$$

whereby the frequency response is substantially linear over a range of video frequencies supplied to said load circuit.

3. In combination, a television picture tube, an output load impedance network for said tube having inherent shunt capacity, a plurality of amplifier stages for the output developed across said impedance, and a compensating network connecting one of said amplifier stages to another of said amplifier stages, said compensating network comprising inductance $L_c$ and resistance R in series shunted by a resistance and inherent shunt capacity $C_s$, said two networks having substantially equal time constants and said shunt resistance being so proportioned to have a value substantially equal to $$\sqrt{\frac{L_c}{2C_s}}$$

whereby the over-all frequency response is substantially linear over a range of approximately 5 megacycles at the input to said other amplifier stage.

4. In combination, a television camera tube, a load impedance network for said tube having inherent shunt capacity, an output circuit connected across said load impedance, and a compensating network connected across said output circuit, said compensating network comprising inductance $L_c$ and resistance in series shunted by a resistance and capacitance $C_s$, said two networks having substantially equal time constants and said shunt resistance having a value substantially equal to $$\sqrt{\frac{L_c}{2C_s}}$$

whereby the frequency response has a nearly constant value over an operating range of video frequencies supplied to said output circuit.

JOSEPH F. WIGGIN.

REFERENCES CITED

The following references are of record in the file of this patent:

UNITED STATES PATENTS

| Number | Name | Date |
|---|---|---|
| 1,931,664 | Lavoie | Oct. 24, 1933 |
| 2,299,875 | Bedford | Oct. 27, 1942 |
| 2,299,891 | Fredendall | Oct. 27, 1942 |
| 2,309,744 | Bedford | Feb. 2, 1943 |